United States Patent
Rohwedder et al.

(10) Patent No.: US 8,108,350 B2
(45) Date of Patent: Jan. 31, 2012

(54) END-TO-END TRACING FOR DATABASE APPLICATIONS

(75) Inventors: Ekkehard Rohwedder, Newark, CA (US); Quan Wang, Portland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1986 days.

(21) Appl. No.: 10/970,900

(22) Filed: Oct. 21, 2004

(65) Prior Publication Data
US 2005/0262060 A1    Nov. 24, 2005

Related U.S. Application Data

(60) Provisional application No. 60/570,223, filed on May 12, 2004.

(51) Int. Cl.
*G06F 7/00* (2006.01)
*G06F 17/00* (2006.01)

(52) U.S. Cl. ........ 707/648; 707/649; 707/672; 707/682; 709/224; 719/328

(58) Field of Classification Search .................. 709/224; 719/328
See application file for complete search history.

(56) References Cited

U.S. PATENT DOCUMENTS

| | | | |
|---|---|---|---|
| 5,796,952 A * | 8/1998 | Davis et al. | 709/224 |
| 6,763,383 B1 * | 7/2004 | Evison et al. | 709/224 |
| 7,051,339 B2 * | 5/2006 | Deverill et al. | 719/328 |

* cited by examiner

*Primary Examiner* — Khanh Pham
*Assistant Examiner* — Azam Cheema
(74) *Attorney, Agent, or Firm* — Silicon Valley Patent Group LLP; Omkar Suryadevara (57) ABSTRACT

Techniques for end-to-end tracing of database operations in source code for database applications are provided. Source code on the client side is instrumented to measure time spent on selected database operation statements (e.g., queries). The selected database operation statements can be uniquely tagged or identified. Tracing is enabled on the database application on the server side so that a log is produced, where the log includes performance (e.g., time spent) information on database operation statements that are executed. The performance information in the log is correlated to the selected database operation statements so that, among other things, the time spent on the client side and the time spent on the server side can be presented for analysis.

28 Claims, 6 Drawing Sheets

END-TO-END TRACING FOR DATABASE APPLICATIONS

This application claims priority to U.S. Provisional Application 60/570,223, filed May 12, 2004, which is hereby incorporated by reference for all purposes.

BACKGROUND OF THE INVENTION

The present invention relates to computer systems. More specifically, the invention relates to providing end-to-end tracing for database statements in source code for database applications.

In order to analyze and optimize software applications, it can be very beneficial to track the amount of time that is spent doing various operations. For example, once an operation is identified that is taking a substantial amount (or more than expected) of time, the operation can be analyzed and optimized to reduce the amount of time.

One such software application is a database management system. Modem database applications are typically composed of clients that issue queries (and other database operations) and a server that satisfies the queries from the database. One of the most popular query languages is Structured Query Language ("SQL"), but other query languages are known.

Database clients can be written in any number of programming languages and standards exist for including SQL statements in source code. For example, SQLJ is a standard for embedding SQL statements in source code written in the Java programming language. SQLJ interacts with Java Database Connectivity ("JDBC") in order to communicate with the database server. More specifically, JDBC provides Application Prograrnming Interfaces ("APIs") for Java that supports SQL.

Figure 1:
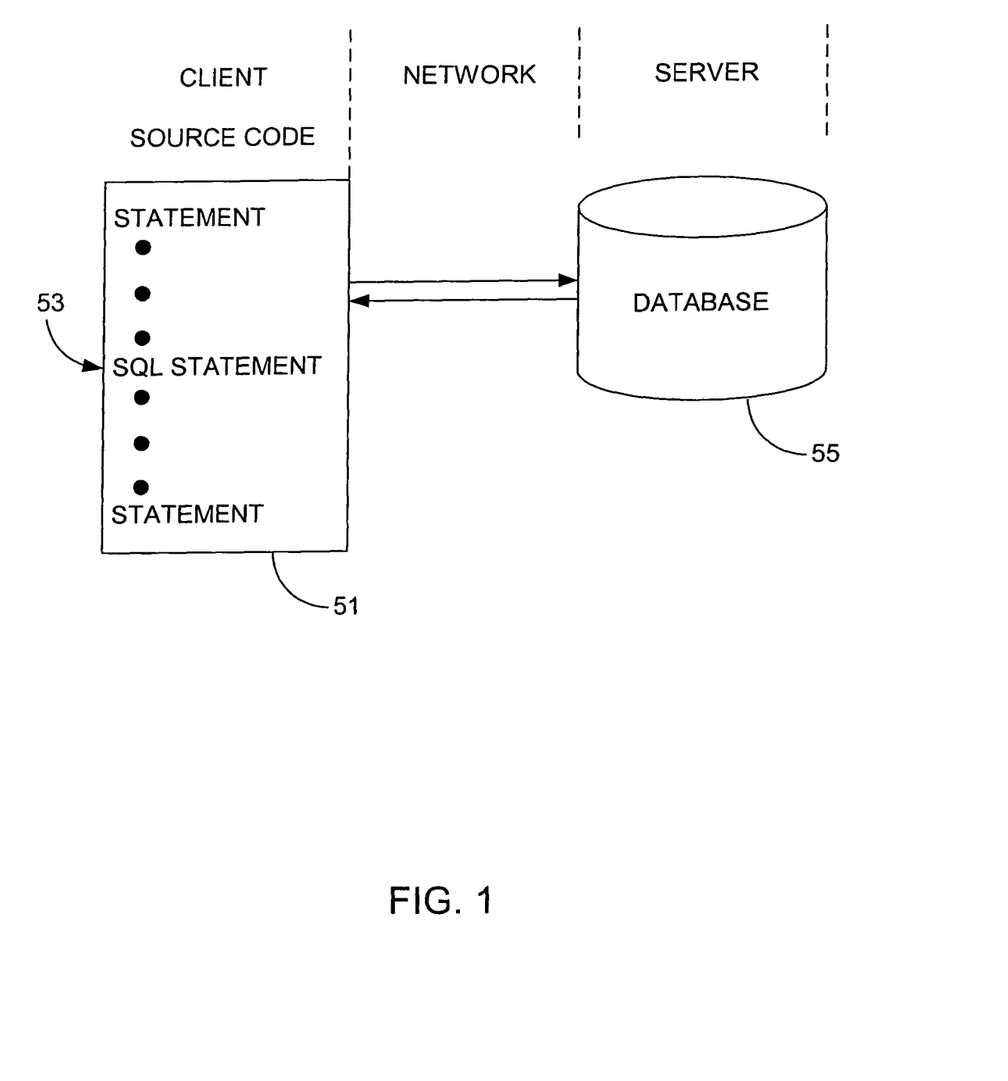
FIG. 1 shows an example of an SQL statement that is embedded in source code being satisfied by a database server.

FIG. 1 shows an example of an SQL statement that is embedded in source code being satisfied by a database server. Source code 51 includes multiple source code statements. An SQL statement 53 specifies a database operation (e.g., a query) to be performed by a database server 55.

The time for executing SQL statement 53 can be associated with different functions. As shown, the time for the client can include time for assembling the SQL statement and formulating a request to the database server. Network time can include sending the query and returning the results. And time for the server can include time for parsing and executing the SQL statement and fetching the results as the client iterates the results.

Current tracing solutions provide a total time spent on the client side, server side and iterating on the results (if any). However, they do not provide a break down of the time spent in each component, which can be important to finding the component that needs optimizations or changes. Additionally, JDBC provides mechanisms for measuring performance. For example, the JDBC can provide method-level and class-level performance. However, method-level and class-level performance is not sufficient in many instances.

Accordingly, it would be beneficial to have innovative techniques for more thoroughly analyzing where time is spent in various components throughout the whole process of executing a database operation that is embedded in source code. Additionally, it would be beneficial to identify components that are causing performance problems. More specifically, it may be important to map and total database service times to specific source locations in client application code, and in addition it may prove useful to sum up service times along a hierarchical structure of the source code.

SUMMARY OF THE INVENTION

The present invention provides innovative techniques for end-to-end tracing of database operations in source code for database applications. In general, the application (e.g., source code) on the client side is instrumented to measure time spent on selected database operation statements (e.g., queries). Additionally, the selected database operation statements can be uniquely tagged or identified. Tracing is enabled on the database server so that a log is produced, where the log includes performance (e.g., time spent) information on database operations related to the SQL statements that are executed. The performance information in the log is correlated to the selected database operations so that, among other things, the time spent on the client side and the time spent on the server side can be presented for analysis. As the elapsed time measured at the client side includes the time spent by the client, the network time, and the time spent on the server side, subtracting out one or more of those times gives an accurate measurement of the others. Some specific embodiments of the invention are described below.

In one embodiment, the invention provides a method of tracing for database operations in computer code of a client. The time spent for executing a database operation in computer code of a client is determined. A log of performance information of database operations performed by a server is received, the log including time spent for executing database operations on the server. The log is analyzed determine time spent for executing the database operation on the server. The time spent on the database operation on the client and time spent on the database operation on the server is then presented. In another embodiment, the invention provides a method of tracing for database operations in source code of a client. A database operation is marked with a unique identifier in source code of a client. The time spent for executing the database operation on the client is determined. A log of performance information of database operations performed by a server is received, the log including time spent for executing database operations on the server. The log is analyzed for the unique identifier to determine time spent for executing the database operation on the server. The time spent on the database operation on the client and time spent on the database operation on the server is presented.

In another embodiment, the invention provides a method of tracing for database operations in source code of a client. A query database operation is marked with a unique identifier in source code of a client. The time spent for executing the query database operation on the client is determined. Additionally, an iterating database operation in the source code of the client associated with the query database operation is identified. The time spent for executing the iterating database operation on the client is determined. A log of performance information of database operations performed by a server is received, the log including time spent for executing database operations on the server. The log is analyzed for the unique identifier to determine time spent for executing the query database operation on the server, wherein the log includes execution and fetching time of the query database operation. The time spent on the client and server for both the query and iterating database operations is presented, wherein the execution time is associated with the query database operation and the fetching time is associated with the iterating database operation.

Other features and advantages of the invention will become readily apparent upon review of the following description and association with the accompanying drawings, where the same or similar structures are designated with the same reference numerals.

DETAILED DESCRIPTION OF PREFERRED EMBODIMENTS

In the description that follows, the present invention will be described in reference to embodiments that provide end-to-end tracing for SQL statements embedded in source code written in Java. Additionally, embodiments will described in terms of a three-tiered database architecture such as is available from Oracle Corporation, Redwood Shores, Calif. However, embodiments of the invention are not limited any particular architecture, language, environment, application, or implementation. For example, although in the embodiments the follow the SQL statements are embedded in Java, the invention can be advantageously applied to any programming language. Therefore, the description of the embodiments that follows is for purposes of illustration and not limitation.

Figure 2:
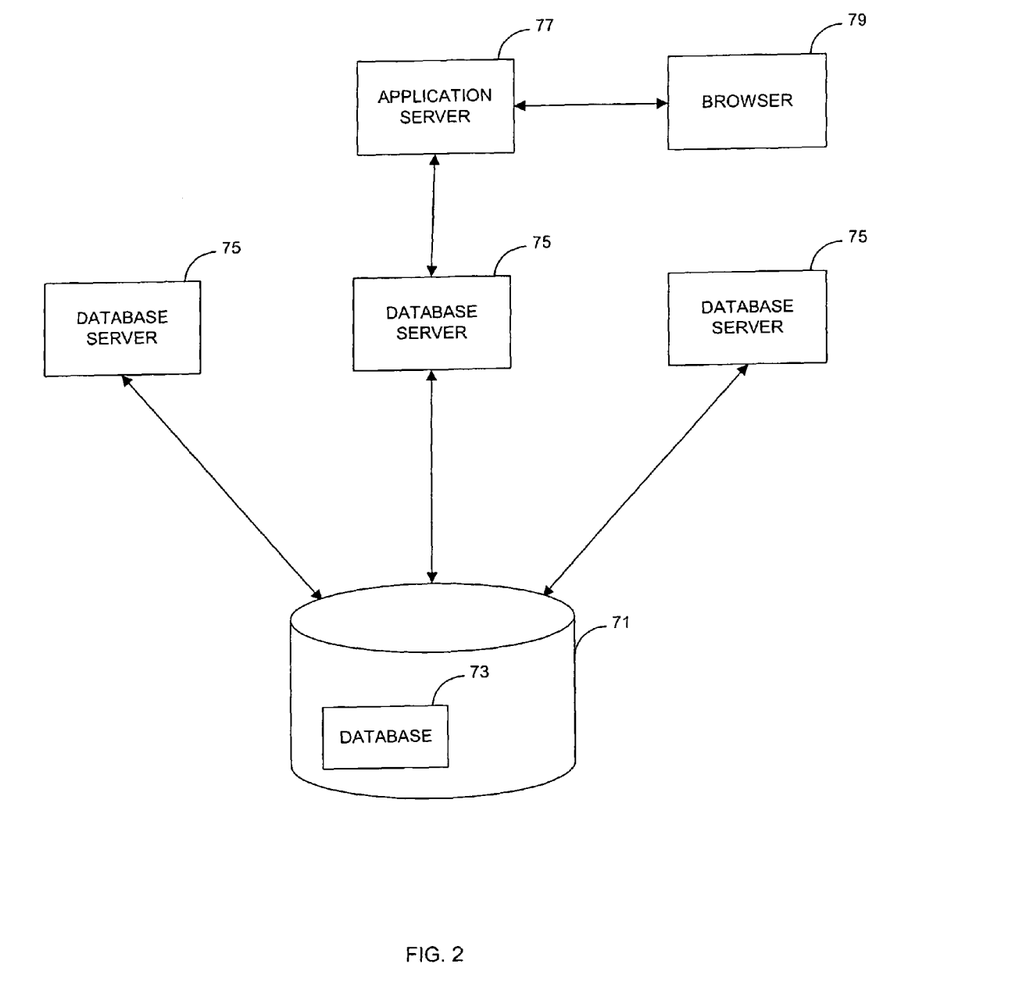
FIG. 2 shows an example of a three-tiered architecture for a database management system.

A fairly common database management system architecture is the three-tiered architecture that is shown in FIG. 2. At the core of the database management system is a central storage 71 that stores a database 73. Database 73 is typically stored on one or more hard drives, which is typically part of a larger computer system. The information can be stored on database 73 in a variety of formats with relational database management systems relying heavily on tables to store the information.

Database servers 75 are instances of a program that interacts with database 73. Each instance of the database server can, among other things, independently query database 73 and store information therein. Database servers 75 may not include user friendly interfaces to access database 73. Database 73 and database servers 75 comprise the lowest tier of the hierarchy.

One or more application server 77 can provide the user interfaces to database server 75. For example, application server 77 can be a web application server on the Internet (or other network). Application server 77 can accept commands from users for accessing database 3 through database server 75. As an example, application server 77 can be an SQL server. Thus, application server 77 is in the middle tier of the hierarchy.

Although application server 77 can accept user commands, a web browser 79 (or other client application) can be utilized to access application server 77 through a user-friendly interface. Web browser 79 is an example of an application in the highest tier in the hierarchy.

Figure 3:
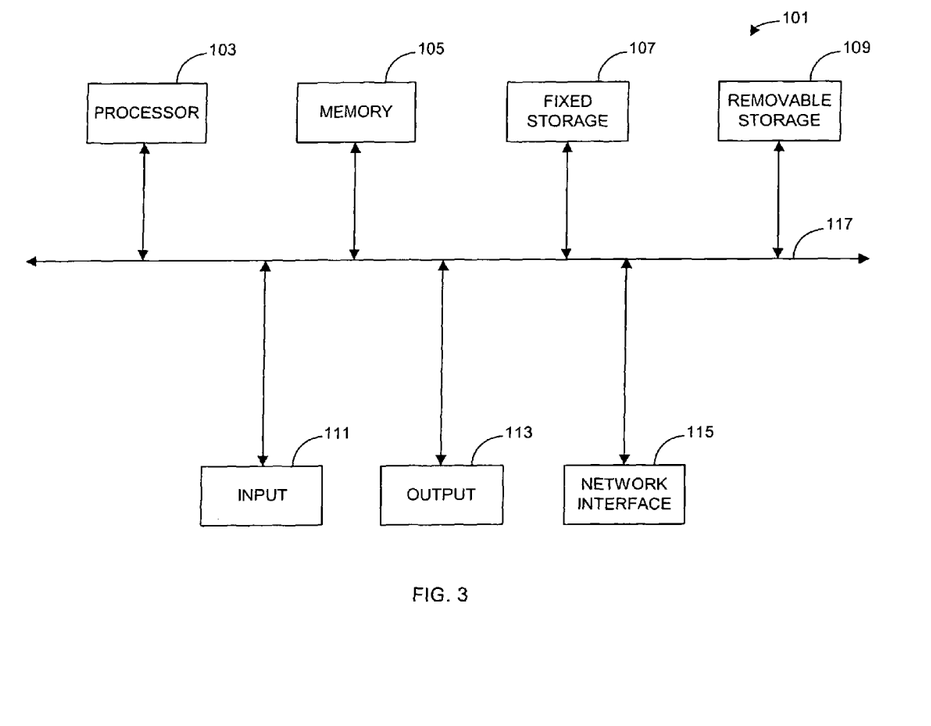
FIG. 3 illustrates a block diagram of a computer system that can be utilized in association with embodiments of the invention.

FIG. 3 shows a block diagram of components that can be present in computer systems that implement embodiments of the invention. A computer system 101 includes a processor 103 that executes instructions from computer programs (including operating systems). Although processors typically have memory caches also, processor 103 utilizes memory 105, which can store instructions or computer code and data.

A fixed storage 107 can store computer programs and data such that it is typically persistent and provides more storage when compared to memory 105. At present, a common fixed storage for databases is multiple (e.g., arrays) hard drives. A removable storage 109 provides mobility to computer programs and/or data that are stored thereon. Examples of removable storage are floppy disks, tape, CD/ROM, flash memory devices, and the like.

Memory 103, fixed storage 107 and removable storage 109 provide examples of non-transitory computer readable storage media that can be utilized to store and retrieve computer programs incorporating computer codes that implement the invention, data for use with the invention, and the like. An input 111 allows a user to interface with the system. Input can be done through the use of a keyboard, a mouse, buttons, dials, or any other input mechanism. An output 113 allows the system to provide output to the user. Output can be provided through a monitor, display screen, LEDs, printer or any other output mechanism.

A network interface 115 allows the system to interface with a network to which it is connected. The system bus architecture of computer system 101 is represented by arrows 117.

The components shown in FIG. 3 can be found in many computer systems. However, components can be added, deleted and combined. For example, fixed storage 107 could be a file server that is accessed through a network connection. Thus, FIG. 3 is for illustration purposes and not limitation.

Now that exemplary database applications and environments have been described, it may be beneficial to discuss embodiments of the invention. Although specific embodiments are described, features can be added and combined without departing from the spirit and scope of the invention. For example, features from more than one of the embodiments can be advantageously implemented in other embodiments.

Figure 4:
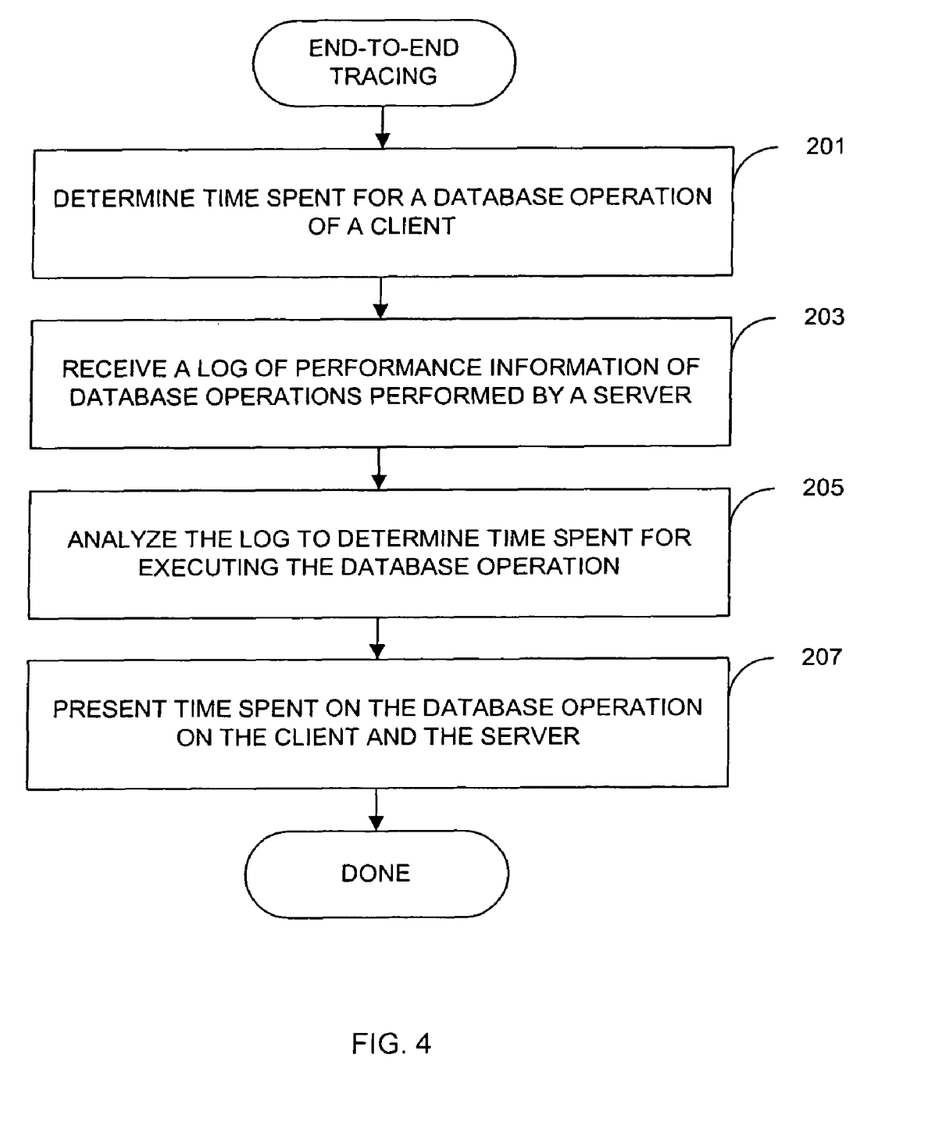
FIG. 4 shows a flowchart of a process of end-to-end tracing for database operations in computer code of a client.

FIG. 4 shows a flowchart of end-to-end tracing for database operations in computer code of a client. As with all flowcharts herein, steps can be added, deleted, reordered, and combined without departing from the spirit and scope of the invention.

At a step 201, the time spent for executing a database operation in computer code of a client is determined. For example, the system clock on the client can be accessed before and after the database operation is executed. The difference would be the total time that it took to execute the database operation both on the client and on the server, as well as the network time. The computer code is typically source code (e.g., the Java programming language), but is not limited to source code.

There are many different kinds of database operations. Some, like updates, may specify a change to a structure (e.g., a row) of a database. These database operations typically return a value indicating whether the operation was executed successfully. Other database operations are not so simple. For example, a database query can be fairly complex. The database query is typically parsed by the server, executed by the server and the server generates the results.

As the results to a database query can be relatively large in size, they are often not returned to the client. Instead, the client may receive a pointer to a data structure containing the results. In other implementations, the client receives a portion of the data from the results (e.g., a first row of many rows) and can iteratively (i.e., using an iterator) request for more of the results. Later paragraphs will describe how query database operations can be processed differently in one embodiment.

The server generates a log of performance information. The log can include various types of performance information, but typically includes the total time spent to execute the database operation in one form or another. At a step 203, a log of performance information of database operations performed by a server, the log including time spent for executing database operations on the server. As will be described below, in some embodiments, the database server is instructed to log this performance information.

The log is analyzed to determine the time spent for executing the database operation on the server at a step 205. If the log allows the database operation in the computer code of the client to which it is associated to be readily identified, the process of correlating database operations in the computer code of the client to the log is straightforward.

In other embodiments, when the computer code of the client is instrumented, a unique identifier (e.g., a timestamp of the system time) is utilized to mark or tag database operations of interest. This unique identifier appears in the log in order to correlate database operations in the computer code of the client to the log.

At a step 207, the time spent on the database operation on the client and time spent on the database operation on the server is presented. For example, the total time spent from the client side was calculated at step 201. If the time spent on the server that was identified or calculated from the log at step 205 is subtracted from the time spent on the client side, the result is the time spent on the client for the database operation and the network time. The tracing information can be presented to a user any number of ways known in the art.

Figure 5:
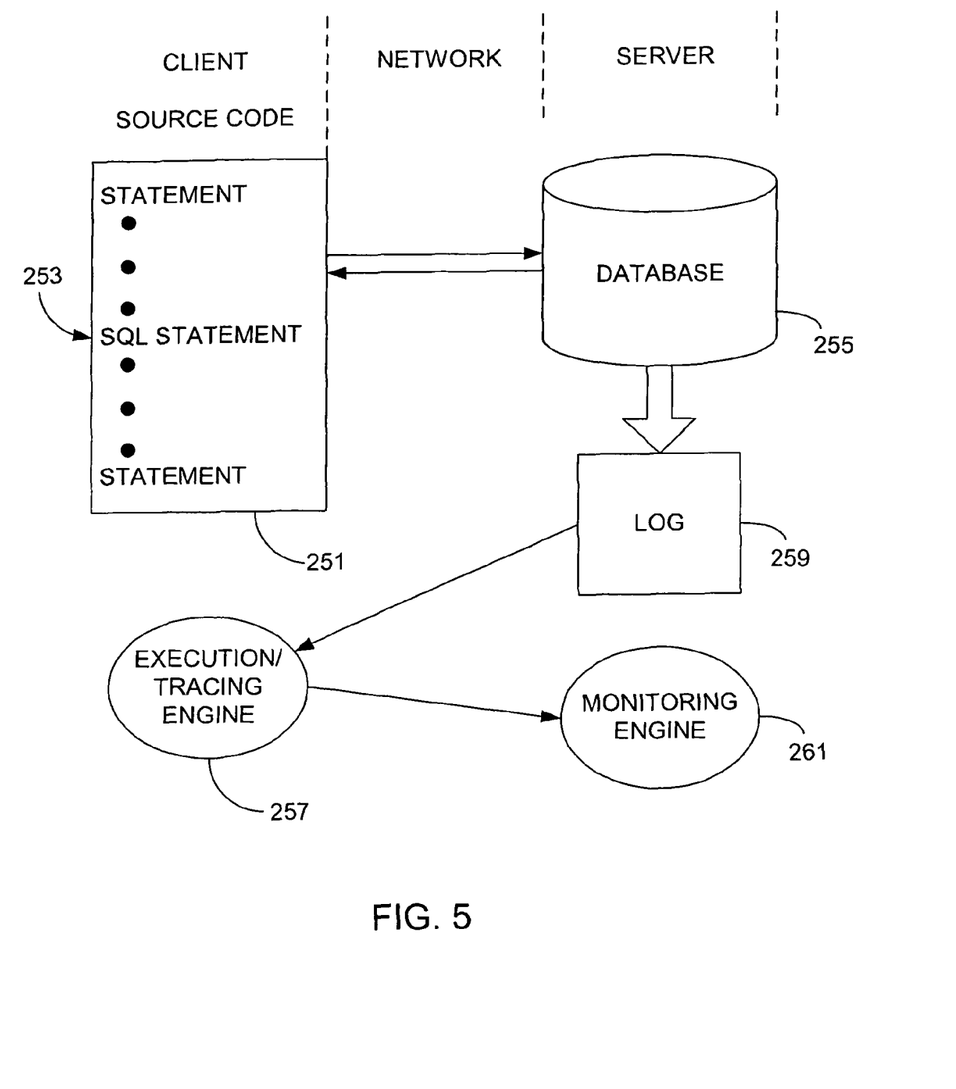
FIG. 5 shows an embodiment of the invention that traces an SQL statement that is embedded in source code being satisfied by a database server.

The flowchart above has been described in reference to any computer code. In the description that follows, embodiments relating to computer code that is Java source code will be described. To begin with, FIG. 5 shows an example of an embodiment of the invention where an SQL statement that is embedded in source code being satisfied by a database server. Source code 251 includes multiple source code statements. An SQL statement 253 specifies a database operation to be performed by a database server 55.

As discussed above, SQLJ is a standard for embedding SQL in Java source code. JDBC provides the APIs to interface Java with database servers. Although the time associated with data traversing the network can be separated out, in some embodiments, the network time is associated with the client.

Database server 255 generates a log 259 of performance data. In some embodiments, the log includes parsing time, execution time and fetching time. The fetching time can correspond to acquiring the results and fulfilling iterator requests for subsequent data from the results.

Log 259 includes a copy of the SQL statements to which performance has been measured. SQLJ specifies a format that includes a place for comments. Thus, in some embodiments, a unique identifier (e.g., a timestamp) is placed in the comment field of SQL statements of interest during instrumentation. As the comment will be reproduced in the log, this provides a way to correlate SQL statements in the source code to the log. Although many SQL statements are different on their own, this mechanism provides a way of distinguishing SQL statements that are identical, but appear at different locations in the source code.

An execution/tracing engine 257 executes source code 251 of the client, including a Java Virtual Machine ("JVM") for Java source code. As mentioned above, the execution/tracing engine can ascertain the total time spent on executing SQL statement 253 in many ways, including a comparison of the system time before and after the SQL statement.

In addition, the execution/tracing engine can receive log 259 and provide tracing information to a user. By subtracting the time spent by the server from the total time measured by the client, the time spent by the client can be obtained or determined. Furthermore, in some embodiments, execution/tracing engine 257 can send the tracing information to a monitoring engine 261 on the server. An example of a monitoring engine is the Dynamic Monitoring Service ("DMS") for use with Oracle databases.

Figure 6:
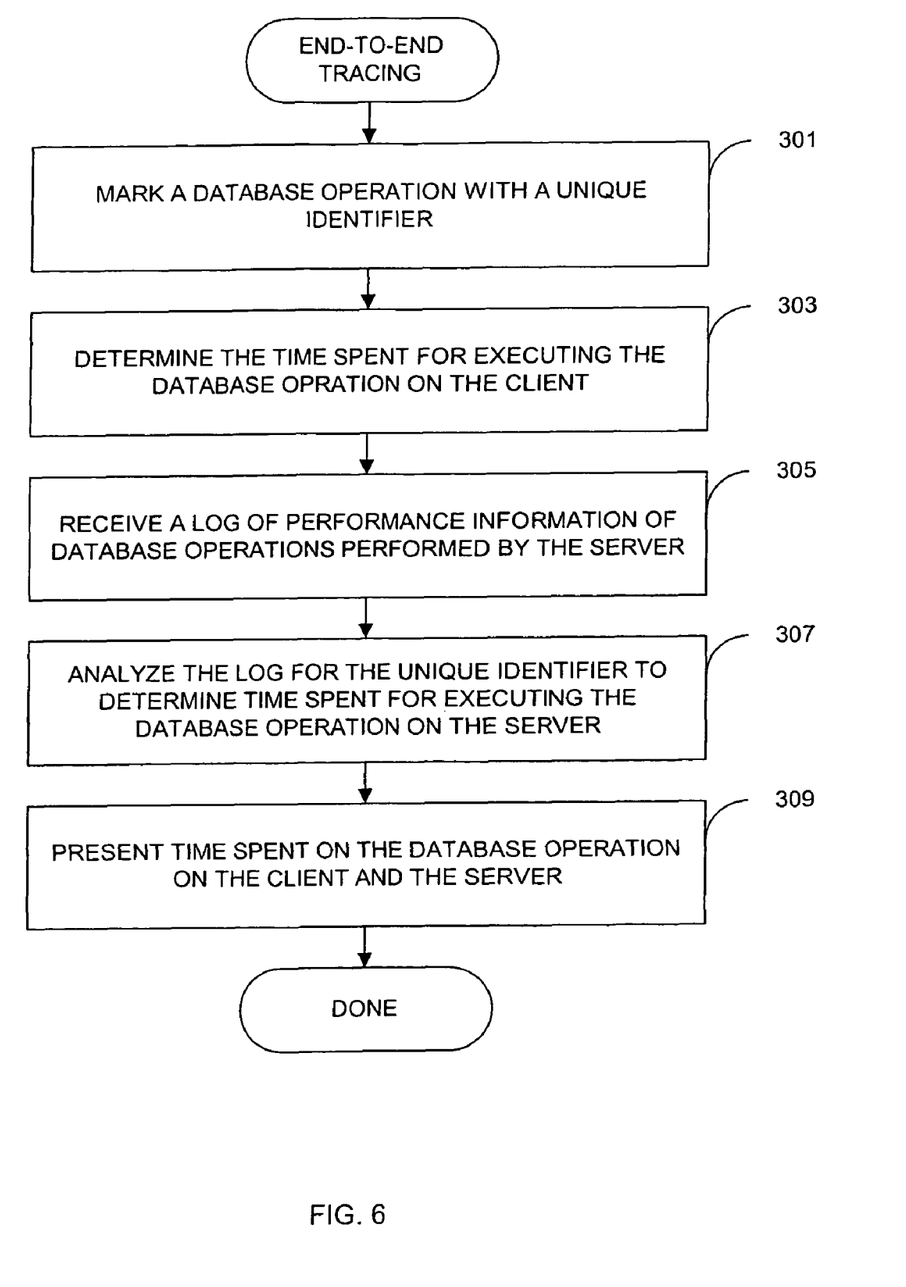
FIG. 6 shows another flowchart of a process of end-to-end tracing for database operations in computer code of a client.

FIG. 6 is another flowchart of a process of end-to-end tracing for database operations in computer code of a client and, more specifically, computer code that includes SQLJ. At a step 301, a database operation is marked (or tagged) with a unique identifier in source code of a client. As mentioned earlier, the unique identifier can be a timestamp that is inserted in a comment of the SQL statement pursuant to SQLJ standards. Other unique identifiers can also be utilized in other embodiments.

If the server is not set to turn on tracing to generate a log of performance, the client will turn on the server-side tracing through JDBC calls. The client is executed and during execution of the client, the time spent for executing the database operation on the client is determined at a step 303.

At a step 305, a log of performance information of database operations performed by a server is received, the log including time spent for executing database operations on the server. The log is analyzed for the unique identifier to determine time spent for executing the database operation on the server at a step 307. The unique identifier for an SQL statement is correlated to performance information in the log that includes an SQL statement with the same unique identifier.

Then, the time spent on the database operation on the client and time spent on the database operation on the server is presented at a step 309. The above flowchart may be modified in some embodiments when processing SQL statements that are queries. The following will describe some additional steps that can be performed.

Assume that an iterator type has been defined and there is an SQLJ query followed by an iterator as follows:

--- sql iter = {SELECT NAME, SALARY FROM EMPLOYEES}
while (iter.next( ))
    System.out.println(iter.ename( ) +", "+ iter.esalary( ))

---

The first line is an SQL query to retrieve name and salary information from the employees. The "while" loop will print the values and loop until there are no more values. The loop is an iterating database operation that iterates over the results from an associated query.

In some embodiments, the performance logs for the database server include times for parsing, executing and fetching for each SQL statement. The fetching time would increase each time the iterating database operation requested more of the results from the query. Accordingly, the time spent on the client side for both the query database operation and the iterating database operation can be determined.

Then, when the log is analyzed, the parsing and execution times are allocated to the query database operation, while the fetching times are allocated to the iterating database operation. In this manner, the time that the server spent is more correctly allocated to the appropriate database operation. In other embodiments, the times in the log can be allocated differently depending on the application.

Embodiments of this invention allow users to measure performance statistics for SQLJ programs. Compared to JDBC support for DMS, which measures method-level and class-level performance, SQLJ support for DMS focuses on the overall performance per SQL statement, such as the execution time for a SQL statement. Also, SQLJ support for DMS measures and corresponds client-side and server-side performance data.

The user chooses to instrument SQLJ programs during translation. At runtime, the instrumented programs collect performance data associated with SQL statement execution. Statistics can be delivered in two ways during runtime, to be stored locally as a hierarchy, or to be sent to DMS via DMS APIs, which requires a running DMS present in the system. Statistics stored locally can be accessed via SQLJ runtime APIs. Statistics sent to DMS can be accessed by DMS tools.

The statistics are designed to help the user understand the performance of the SQL statement execution. The statistics are organized as a hierarchy of (from the top to the bottom) application, module, action, and statement. An application consists of the SQLJ and Java programs mentioned in a SQLJ translator command line. A module corresponds to a Java package. In some embodiments, we only instrument SQLJ declarations and statements (in .sqlj files), but embodiments in other applications may differ. An action maps to a Java class defined in a Java or SQLJ program. A statement is a SQL statement in a SQLJ program.

In some embodiments, there is added flexibility for mapping modules and actions. However, mapping to packages and classes, respectively, appears to be a usable default approximation of this hierarchy that is well understood by Java programmers.

Various statistics for application, module, action, and SQL statement are measured. Specifically, in some embodiments, the following statistics are measured:
  Server side
    parsing time
    execution time
    fetching time
  Client side
    the elapsed time for a SQL statement, including parsing, execution
    getNext time, the time fetching the next result row
    getXXX time, the time fetching a column named XXX Sensors are performance statistics collected during the execution of translated SQLJ programs. The sensors can be delivered to DMS or stored locally, depending on the new setting in the property file for the application, which will be discussed later.

Sensors are organized as a hierarchy. Each sensor has a path name. Below are typical formats of sensors:
/SQLJ/<application>/<sensor name>
/SQLJ/<application>/<module>/<sensor name>
/SQLJ/<application>/<module>/<class>/<sensor name>
/SQLJ/<application>/<module>/<class>/<n>/<sensor name>

The item <application> is the name of the application, which is given by the SQLJ option "–instrument=<application>", which is "defaultApp" by default. If the sensor is associated with a package, the item <module> is the package name. A empty package name is noted as "*TopLevel*". If the sensor is associated with a class, The item <class> is the class name. If a sensor is associated with a SQL statement, the item <n> is the line number of the SQL statement in the SQLJ program being instrumented. If multiple SQL statements appears in the same line, we will use their starting column position to distinguish them. For instance, <n> could be 8.13, where 8 the line number, 13 is the column number.

The following are the sensors and metrics used in SQLJ application tracing. For numerical sensors, the metrics include minTime, maxTime, and avg, which record the minimal time, maximal time, average time performing the corresponding action. Also a numerical sensor has a metric "count", recording the number of times that action has been performed.

(1) SQLString:

The SQLString sensor records all the SQLString executed during the measurement. The formation of the SQLString sensor is =/SQLJ/<application>/<module>/<class>/<n>/SQLString. The metric for a SQLString sensor is "value", which holds the actual SQL statements in that particular location. The string of the SQL statement is the exact string that is passed to JDBC (including any transformations made from the original #sql statement).

(2) ContextType

The ContextType sensor records all the SQLJ connection context types, in the form of /SQLJ/<application>/<module>/<class>/<n>/ContextType. The metric for the ContextType sensor is "value", which holds the actual Connection Context type name for that particular location.

(3) error

The "error" sensor records the "value" metric, the number of statement executions that cause exceptions, in the form of /SQLJ/<application>/<module>/<class>/error.

(4) StmtCacheSize

The StmtCacheSize sensor uses the metric "value" to record – the current (last) statement cache size, per connection context type, in the form of /SQLJ/<application>/<context type>/StmtCacheSize.

(5) StmtExecuted

The StmtExecuted sensor uses the metric "value" to record the number of statement executions per <application>/<module>/<action> or connection context type, in the form of /SQLJ/<application>/<context type >/StmtCacheSize.

(6) StmtsCacheExecuted

The StmtsCacheExecuted sensor uses the metric "value" to record -- the number of statement executions from the cache per <application>/<module>/<action> or connection context type, in the form of /SQLJ/<application>/<context type>/StmtsCacheExecuted.

(7) BatchableStmts

The BatchableStmts sensor uses the metric "value" to record – the number of batchable statement executions per <application>/<module>/<action> or connection context type, in the form of /SQLJ/<application>/<context type>/BatchableStmts.

(8) BatchableStmtsOn

The BatchableStmts sensor uses the metric "value" to record – the number of batchable statement execution with batching turned on per <application>/<module>/<action> or per connection context type, in the form of /SQLJ/<application>/<context type>/BatchableStmtsOn.

(9) BatchExecutes

The BatchableStmts sensor uses the metric "value" to record – the number of actual batch flushes/real batch executions that have occurred per <application>/<module>/<action> or connection context type, in the form of /SQLJ/<application>/<context type>/BatchExecutes.
Hierarchy/Sensor:
<prefix>/SetXxx
Metrics:
time—the time spent executing the setter method setXxxo
minTime
maxTime
count
avg
active (10) SetXxx SetXxx is a numerical sensor measuring the performance of initializing the SQL statement variable "xxx", in the form of /SQLJ/<application>/<module>/<class>/SetXxx. The term "xxx" represents an indentifiier, while "Xxx" represents the same identifier with the first letter capitalized.

(11) Execute

Execute is a numerical sensor measuring the total time executing a JDBC statement, in the form of /SQLJ/<application>/<module>/<class>/<n>/Execute. To measure the execution time of a JDBC statement, just before executing a statement the clock can be started. This clock is stopped when either – finish executing the statement/obtaining a result set, or we are catching an exception.

(12) ServerExecute

ServerExecute is a numerical sensor measuring the server-side time executing a JDBC statement, in the form of /SQLJ/<application>/<module>/<class>/<n>/ServerExecute.

(13) Next

ServerExecute is a numerical sensor measuring the total time iterating a query result, in the form of /SQLJ/<application>/<module>/<class>/<n>/Next (14) ServerFetch ServerExecute is a numerical sensor measuring the server-side time iterating a query result, in the form of /SQLJ/<application>/<module>/<class>/<n>/ServerFetch.

(15) GetXxx

SetXxx is a numerical sensor measuring the performance of fetching the column xxx from the query result, in the form of /SQLJ/<application>/<module>/<class>/GetXxx. The term "xxx" represents an indentifiier, while "Xxx" represents the same identifier with the first letter capitalized.

An SQLJ application is translated into a Java program by the SQLJ translator. During SQLJ translation, one can specify "-instrucment" to turn on end-to-end tracing, in which case, the generated Java code will has end-to-end tracing ability. When the instrumented application is executed, the end-to-end tracing sensors will be generated at runtime. In some embodiments, an option can be provided to get a monitor for all applications. Also, the sensors may live in at different locations, depending on the implementation.

From a reporting perspective, different "reporting levels" may be considered by reporting: (a) only report the sensors over all applications, (b) add reporting the sensors for each application, (c) add reporting the sensors for each module (package), (d) add reporting the sensors for each action (class), or (e) report everything. A reporting level property may be utilized to achieve this.

For an SQLJ application, it is desirable to understand the roles which various components play, such as time spent on the client side, time spent on the server side, and such time spent for iterator. With embodiments of the invention, an SQLJ application is instrumented during the SQLJ translation process. For each SQL statement, from the client side, the total time it takes to evaluate that SQL statement is measured.

Meanwhile, the server trace log (or file) is examined to determine the time in which the server spent on parsing, executing and fetching the SQL statement (and results). Therefore, it is possible to distinguish the client side cost and the server side cost in processing the SQL statement.

This tracing mechanism enables a customer to monitor the performance of the SQLJ application and more importantly to identify the components that causes performance problem(s). Therefore, tool incorporating an embodiment of the invention can be very useful in real-world scenarios where performance is often critical.

Advantages include a better understanding of the performance impact of various SQLJ and JDBC runtime components. Although enabling the server side tracing can slow down the database and the instrumentation process can introduce some complexity for the user, embodiments of the invention can attempt to minimize these effects for the greater functionality achieved.

While the above is a complete description of preferred embodiments of the invention, various alternatives, modifications, and equivalents can be used. It should be evident that the invention is equally applicable by making appropriate modifications to the embodiments described above. For example, although properties of specific embodiments have been described, embodiments of the invention are not limited to these properties. Therefore, the above description should not be taken as limiting the scope of the invention that is defined by the metes and bounds of the appended claims along with their full scope of equivalents.

What is claimed is:

1. A method of tracing for database operations in computer code of a client, comprising:
   determining time spent for executing a database operation in computer code of a client;
   receiving a log of performance information of database operations performed by a server, the log including time spent for executing database operations on the server;
   analyzing the log to determine time spent for executing the database operation on the server; and
   presenting time spent on the database operation on the client and time spent on the database operation on the server.

2. The method of claim 1, further comprising determining the time spent on the database operation on the client by subtracting the time spent on the database operation on the server from a total time spent.

3. The method of claim 2, wherein the total time spent is measured on the client by a change in time before and after the database operation is performed.

4. The method of claim 1, further comprising marking the database operation with a unique identifier in the computer code of the client .

5. The method of claim 4, further comprising correlating performance information from the log to the database operation utilizing the unique identifier.

6. The method of claim 4, wherein the unique identifier is a timestamp.

7. The method of claim 1, further comprising:
   analyzing the log to determine time spent for executing the database operation on the network; and
   presenting time spent on the database operation on the network.

8. A non-transitory computer program product that traces for database operations in computer code of a client, comprising:
   computer code that determines time spent for executing a database operation in computer code of a client;

computer code that receives a log of performance information of database operations performed by a server, the log including time spent for executing database operations on the server;

computer code that analyzes the log to determine time spent for executing the database operation on the server;

computer code that presents time spent on the database operation on the client and time spent on the database operation on the server; and a non-transitory computer readable storage medium that stores the computer codes.

9. The computer program product of claim 8, wherein the computer readable medium is a CD-ROM, floppy disk, tape, flash memory, system memory, or hard drive.

10. A database system comprising:
a server that executes database operations and generates a log of performance information for the database operations; and
a client that determines time spent for executing a database operation in computer code of a client, receives the log from the server, analyzes the log to determine time spent for executing the database operation on the server, and presents time spent on the database operation on the client and time spent on the database operation on the server.

11. A method of tracing for database operations in source code of a client, comprising:
marking a database operation with a unique identifier in source code of a client;
determining time spent for executing the database operation on the client;
receiving a log of performance information of database operations performed by a server, the log including time spent for executing database operations on the server;
analyzing the log for the unique identifier to determine time spent for executing the database operation on the server; and
presenting time spent on the database operation on the client and time spent on the database operation on the server.

12. The method of claim 11, further comprising determining the time spent on the database operation on the client by subtracting the time spent on the database operation on the server from a total time spent.

13. The method of claim 12, wherein the total time spent is measured on the client by a change in time before and after the database operation is performed.

14. The method of claim 11, further comprising correlating performance information from the log to the database operation utilizing the unique identifier.

15. The method of claim 11, wherein the unique identifier is a timestamp.

16. A non-transitory computer program product that traces for database operations in source code of a client, comprising:
computer code that marks a database operation with a unique identifier in source code of a client;
computer code that determines time spent for executing the database operation on the client;
computer code that receives a log of performance information of database operations performed by a server, the log including time spent for executing database operations on the server;
computer code that analyzes the log for the unique identifier to determine time spent for executing the database operation on the server;
computer code that presents time spent on the database operation on the client and time spent on the database operation on the server; and a non-transitory computer readable storage medium that stores the computer codes.

17. The computer program product of claim 16, wherein the computer readable medium is a CD-ROM, floppy disk, tape, flash memory, system memory, or hard drive.

18. A database system, comprising:
a server that executes database operations and generates a log of performance information for the database operations; and
a client that marks a database operation with a unique identifier in source code of a client, determines time spent for executing the database operation on the client, receives the log from the server, analyzes the log for the unique identifier to determine time spent for executing the database operation on the server, and presents time spent on the database operation on the client and time spent on the database operation on the server.

19. A method of tracing for database operations in source code of a client, comprising:
marking a query database operation with a unique identifier in source code of a client;
determining time spent for executing the query database operation on the client;
identifying an iterating database operation in the source code of the client associated with the query database operation;
determining time spent for executing the iterating database operation on the client;
receiving a log of performance information of database operations performed by a server, the log including time spent for executing database operations on the server;
analyzing the log for the unique identifier to determine time spent for executing the query database operation on the server, wherein the log includes execution and fetching time of the query database operation; and
presenting time spent on the client and server for both the query and iterating database operations, wherein the execution time is associated with the query database operation and the fetching time is associated with the iterating database operation.

20. The method of claim 19, further comprising determining the time spent on the query database operation on the client by subtracting parsing and execution times spent on the query database operation on the server from a total time spent.

21. The method of claim 20, wherein the total time spent is measured on the client by a change in time before and after the query database operation is performed.

22. The method of claim 19, further comprising determining the time spent on the iterating database operation on the client by subtracting a fetching time spent on the query database operation on the server from a total time spent.

23. The method of claim 22, wherein the total time spent is measured on the client by a change in time before and after the iterating database operation is performed.

24. The method of claim 19, further comprising correlating performance information from the log to the database operation utilizing the unique identifier.

25. The method of claim 19, wherein the unique identifier is a timestamp.

26. A non-transitory computer program product that traces for database operations in source code of a client, comprising:
computer code that marks a query database operation with a unique identifier in source code of a client;
computer code that determines time spent for executing the query database operation on the client;

computer code that identifies an iterating database operation in the source code of the client associated with the query database operation;

computer code that determines time spent for executing the iterating database operation on the client;

computer code that receives a log of performance information of database operations performed by a server, the log including time spent for executing database operations on the server;

computer code that analyzes the log for the unique identifier to determine time spent for executing the query database operation on the server, wherein the log includes execution and fetching time of the query database operation;

computer code that presents time spent on the client and server for both the query and iterating database operations, wherein the execution time is associated with the query database operation and the fetching time is associated with the iterating database operation; and a non-transitory computer readable storage medium that stores the computer codes.

27. The computer program product of claim 26, wherein the computer readable medium is a CD-ROM, floppy disk, tape, flash memory, system memory, or hard drive.

28. A database system, comprising:

a server that executes database operations and generates a log of performance information for the database operations; and a client that marks a query database operation with a unique identifier in source code of a client, determines time spent for executing the query database operation on the client, identifies an iterating database operation in the source code of the client associated with the query database operation, determines time spent for executing the iterating database operation on the client, receives the log from the server, analyzes the log for the unique identifier to determine time spent for executing the query database operation on the server, wherein the log includes execution and fetching time of the query database operation, and presents time spent on the client and server for both the query and iterating database operations, wherein the execution time is associated with the query database operation and the fetching time is associated with the iterating database operation.

* * * * *

UNITED STATES PATENT AND TRADEMARK OFFICE
CERTIFICATE OF CORRECTION

Page 1 of 2

PATENT NO. : 8,108,350 B2
APPLICATION NO. : 10/970900
DATED : January 31, 2012
INVENTOR(S) : Rohwedder et al.

It is certified that error appears in the above-identified patent and that said Letters Patent is hereby corrected as shown below:

On sheet 6 of 6, in figure 6, Box no. 303, line 2, delete "OPRATION" and insert -- OPERATION --, therefor.

In column 1, line 22, delete "Modem" and insert -- Modern --, therefor.

In column 1, line 35, delete "Prograrnming" and insert -- Programming --, therefor.

In column 4, line 30-34, delete "The components shown in FIG. 3 can be found in many computer systems. However, components can be added, deleted and combined. For example, fixed storage 107 could be a file server that is accessed through a network connection. Thus, FIG. 3 is for illustration purposes and not limitation." and insert the same on Col. 4, Line 29, after "117." as a continuation of the same paragraph.

In column 8, line 3, delete "The" and insert -- the --, therefor.

In column 8, line 25, delete "#sq1" and insert -- #sql --, therefor.

In column 8, line 45, delete "type >" and insert -- type> --, therefor.

In column 9, line 6, delete "setXxxo" and insert -- setXxx() --, therefor.

In column 9, line 17, delete "indentifiier," and insert -- identifier, --, therefor.

In column 9, line 34, after "Next" insert -- . --.

In column 9, line 43, delete "indentifiier," and insert -- identifier, --, therefor.

In column 9, line 47, delete ""-instrucment"" and insert -- "-instrument" --, therefor.

Signed and Sealed this
First Day of May, 2012

David J. Kappos
*Director of the United States Patent and Trademark Office*

CERTIFICATE OF CORRECTION (continued)
U.S. Pat. No. 8,108,350 B2

In column 10, line 52, in Claim 4, delete "client ." and insert -- client. --, therefor.

In column 11, line 15, in Claim 10, delete "system" and insert -- system, --, therefor.